July 11, 1939.  M. G. CROSBY  2,165,229
PHASE MODULATION
Filed Sept. 21, 1933  3 Sheets-Sheet 1

INVENTOR
M. G. CROSBY
BY
ATTORNEY

July 11, 1939.　　　M. G. CROSBY　　　2,165,229
PHASE MODULATION
Filed Sept. 21, 1933　　　3 Sheets-Sheet 3
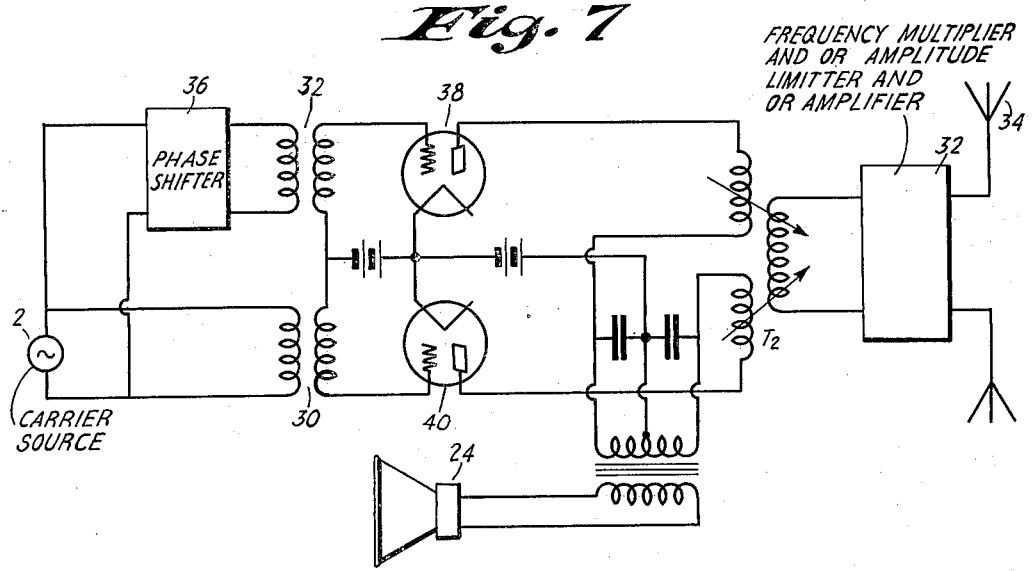
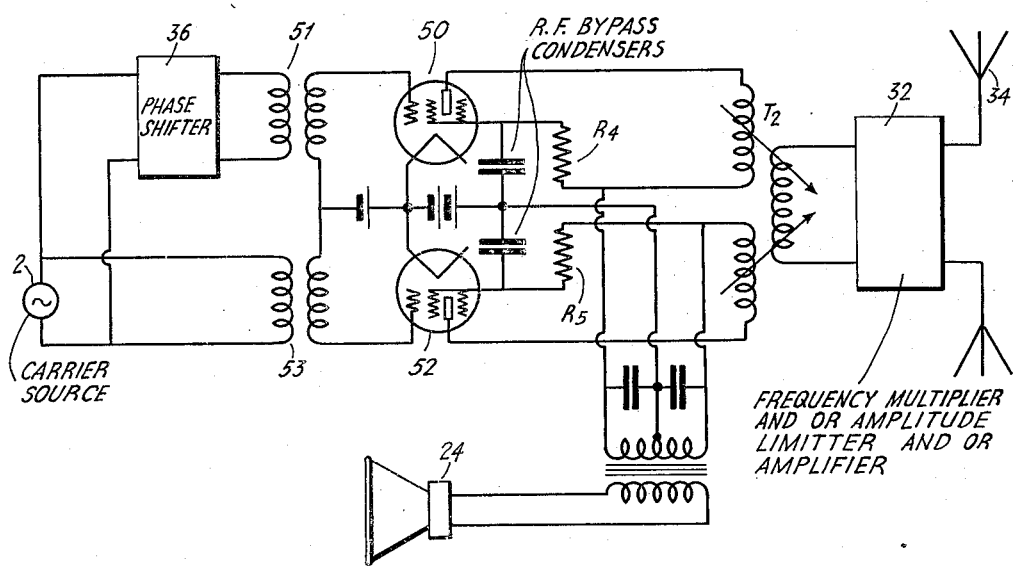
INVENTOR
M.G. CROSBY
BY
ATTORNEY Patented July 11, 1939

2,165,229

UNITED STATES PATENT OFFICE 2,165,229

PHASE MODULATION

Murray G. Crosby, Riverhead, N. Y., assignor to Radio Corporation of America, a corporation of Delaware Application September 21, 1933, Serial No. 690,330

3 Claims. (Cl. 179—171)

This invention relates to the signalling art and pertains especially to the transmission of intelligence from one geographically separated point to another by the use of phase modulated waves or carrier energy.

An object of my present invention is to provide a new and useful system for producing a phase modulated wave of substantially constant frequency and amplitude. To do so I provide an arrangement and a method wherein two carrier frequency voltages of substantially like frequency are combined less than 180 degrees out of phase, or any multiple of less than 180 degrees out of phase, to produce a resultant voltage. According to my invention the phase of the resultant voltage is varied at signal frequency by varying the relative values of the voltages combined at a signal frequency rate and an amount proportional to the amplitude of the signal frequency, limited, of course, by the phase shift referred to above imparted to the two portions of the carrier. The voltages may be phase shifted and amplitude modulated before combining or amplitude modulated and then phase shifted before combining.

Any amplitude modulation caused in the resultant phase modulated wave may be eliminated by limiting the resultant energy. To do so the energy may be passed through electron discharge devices operated at their saturation point.

More specifically, according to my present invention, I carry out the foregoing objects by introducing in the circuits of a pair of electron discharge devices voltages of like frequency a predetermined number of degrees out of phase such that the phase difference is not 0°, 180° or any whole multiple of 180°, although phase differences varying slightly from 0°, 180°, etc., are suitable. The outputs of the devices are so combined that there is a resultant voltage of like frequency. To vary the phase of this resultant voltage, or, in other words, the phase of the resultant carrier energy, I vary oppositely the internal impedances of the electron discharge devices. In a modification the order of the operations may be reversed or changed. The present invention relates to improvements in phase modulators of the type disclosed in my United States application Serial No. 588,309, filed January 23, 1932, Patent No. 2,081,577, dated May 25, 1937.

As required by law, my present invention is defined with particularity in the appended claims. However, it may best be explained both as to its structural organization and mode of operation by referring to the accompanying drawings, wherein:

Figure 1:
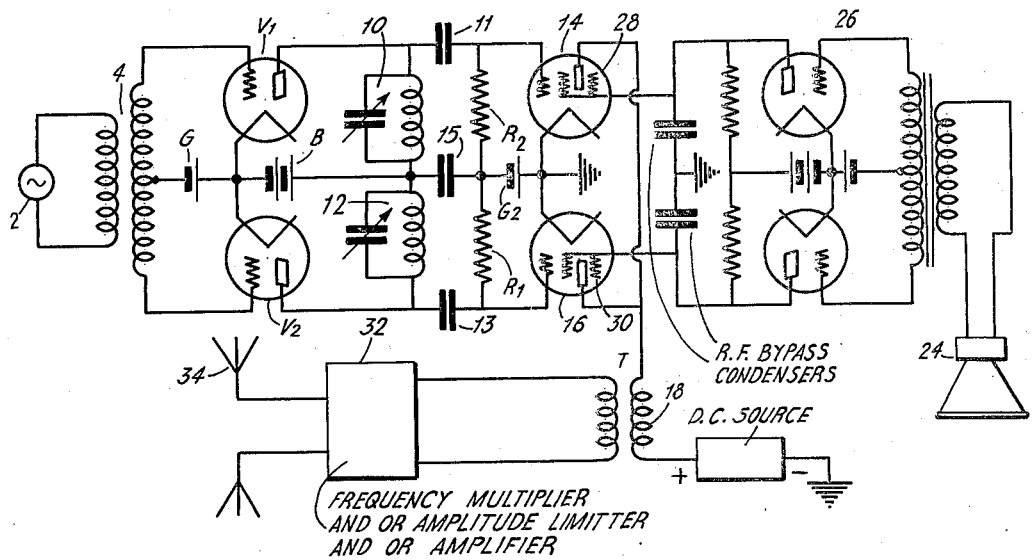
Figure 1 is a wiring diagram of a phase modulation transmitting system according to my present invention.

Turning to Figure 1, illustrating a transmitter for transmitting phase modulated energy, carrier energy or potentials from an oscillation generator 2 are fed to the primary winding of a transformer 4, the secondary winding of which is symmetrically divided and connected as shown to the control grids of two discharge devices $V_1$ and $V_2$. The generator 2 may be a crystal controlled oscillator, or any other form of substantially constant frequency oscillation generator. The oscillations from 2 are applied in phase opposition to the control grids of $V_1$ and $V_2$. Biasing potentials for the control grids of $V_1$ and $V_2$ are supplied from the source G connected as shown.

The anodes of tubes $V_1$ and $V_2$ are connected, as shown, through tuned circuits 10 and 12 respectively and a source of anode potential B to the cathodes of said tubes, which are connected together, as shown. The anodes of tubes $V_1$ and $V_2$ are also connected, as shown, by way of blocking condensers 11 and 13 to the control grid electrodes of tubes 14 and 16 respectively. Biasing potentials for the control grid electrodes of tubes 14 and 16 respectively are supplied from a source $G_2$ connected, as shown, by way of resistance $R_1$ and $R_2$ to the control grids of tubes 14 and 16 respectively. The point of connection between the resistances $R_1$ and $R_2$ is connected, as shown, by way of a condenser 15 to the terminal of the source B. The anode electrodes of tubes 14 and 16 are connected together and to the cathodes by way of an inductance 18 and a direct current source. The inductance 18 may form the primary winding of a transformer T, the secondary winding of which may be connected to a utilization circuit.

The tuned circuits 10 and 12 serve as plate impedances of the coupling tubes and also as phase adjusters to adjust the phase of the amplified carrier fed to the grids of the modulator tubes 14 and 16 respectively. By tuning one of these tuned circuits, for example, 10, on the inductive side of resonance, and the other of the tuned circuits, as, for example, 12, on the capacitive side of resonance, the phase of the voltage applied to the grid of one of the tubes 14 and 16, is made lagging and to the other leading. Adjustment for a 45° lag and 45° lead will make a total phase difference of 90° difference. Since the carrier voltages are fed to the carrier tubes 180° out of phase by the push-pull input transformer 4, the total phase difference between the two modulator grid voltages will be 180° plus 90° or 270°. However, the optimum phase adjustment of the two differentially modulated voltages to produce phase modulation may be either 90° or any odd multiple of 90°, so that 270° is equally as effective as 90°. This has been explained in considerable detail in United States application No. 588,309, filed January 23, 1932.

Figure 2:
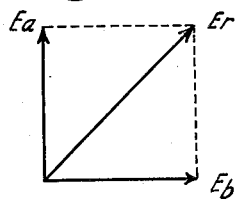
Figures 2 and 3 are vector diagrams given in order to explain the operation of the system shown in Figure 1; while, Figures 4 to 8 inclusive are wiring diagrams of modified phase modulators arranged in accordance with the present invention.

The vectorial relationship of the voltages in circuits 10 and 12 is illustrated in Figure 2 for the particular case of 90 degrees separation where $E_a$ illustrates the voltage in circuit 10 and $E_b$ indicates the alternating voltage in circuit 12. These voltages are applied, as shown, to the control grids of tubes 14 and 16 to be amplified therein and consequently in the output circuit 18 of tubes 14, 16 there appears voltage $E_r$ as shown in Figure 2. This is a resultant voltage which is of a frequency equal to the frequency of the frequency of the voltage applied from source 2.

Figure 3:
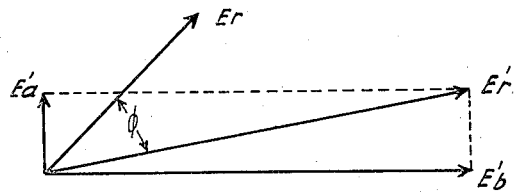

By oppositely varying the output of each of the two electron discharge devices 14, 16, the resultant may be made to shift between $E_a$ and $E_b$ as limits, as shown, in Figure 3. The shift may be from $E_r$ to $E'_r$, as indicated. This shift in phase is accomplished by relatively decreasing the amplified voltage $E_a$ appearing in the output circuit due to the amplifier action of tube 14 and relatively increasing amplified voltage $E_b$ from tube 16 appearing in the output circuit and vice versa.

In order to cause this opposite variation in voltages in tubes 14, 16, modulation energy from a suitable source 24 and amplified by push-pull amplifier 26 is fed as indicated in opposite phase to the screen grids 28, 30 of tubes 14, 16. Consequently, the internal impedances of tubes 14 and 16 are varied oppositely and, as a result, their outputs are varied inversely to their internal impedances, thereby causing a phase shift of the resultant energy appearing in the output circuit 18 of the tubes. The phase modulated energy so appearing in the output circuit 18 of electron discharge devices 14, 16 may then be amplitude limited, and/or frequency multiplied, and/or amplified by a suitable device in 32 and radiated or propagated through space in the form of electromagnetic wave energy by means of a suitable antenna 34, or may be utilized directly from 18.

Figure 4:
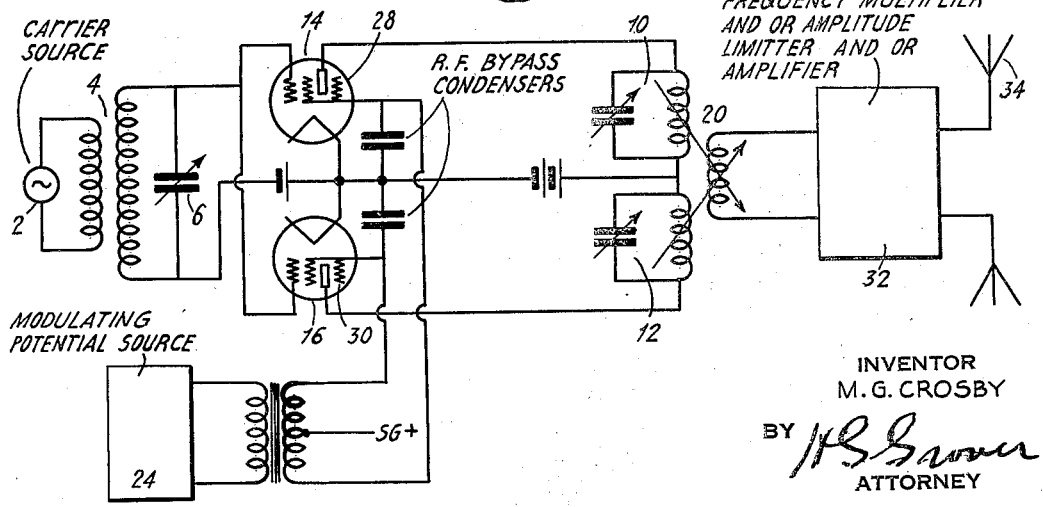

As will be evident from an inspection of Figure 3, the greatest amount of phase shift possible with the scheme so far described is a value less than 180 degrees, or with 90 degrees phase displaced voltages, 90 degrees; and it is also evident that this arrangement introduces a small amount of amplitude modulation. To eliminate the amplitude modulation a thermionic relay device in 32 may be operated at all times at its saturation point. To increase or augment the relative amount of phase modulation, the apparatus 32 may include also some form of frequency multiplier.

Where desired the number of tubes in the phase modulator may be reduced by utilizing a circuit arrangement as shown in Figure 4. There the carrier frequency oscillations from the source 2 are applied in phase to the control grids of tubes 14 and 16. In the arrangement of Figure 1 the oscillations were applied in phase opposition to the grids of the coupling tubes $V_1$ and $V_2$. In the present arrangement the phase difference is obtained in the tuned output circuits 10 and 12, which, in this case, are connected between the anodes and cathodes of tubes 14 and 16 respectively. Here, as in the prior arrangement, one of the tuned circuits, as, for example, 10, is capacitive to produce a leading voltage which may lead 45°, while the other tuned circuit, 12, is inductive to produce a lagging voltage, which may lag 45°, so that the total separation is 90°. In the prior arrangement, that is, in the arrangement of Figure 1, the phase modulation is produced by differentially modulating two phase shifted carriers, that is, the phase shifted carriers appearing in 10 and 12 of Figure 1 are differentially modulated in the tubes 14 and 16. In the present case the carriers are differentially modulated in tubes 14 and 16 by the modulating potentials applied to the screen grids from the source 24 by way of the transformer, and the differentially modulated carriers are then shifted as to phase in the tuned circuits 10 and 12. The differentially modulated phase shifted carrier portions are impressed from the tuned circuits 10 and 12 on to the secondary winding 20 and from said winding to the utilization circuit 34 by way of the unit 32. In order to insure that each of the tuned output circuits impress equal outputs on the secondary winding 20, said winding is variably coupled, as shown, to the inductances in tuned circuits 10 and 12.

Figure 5:
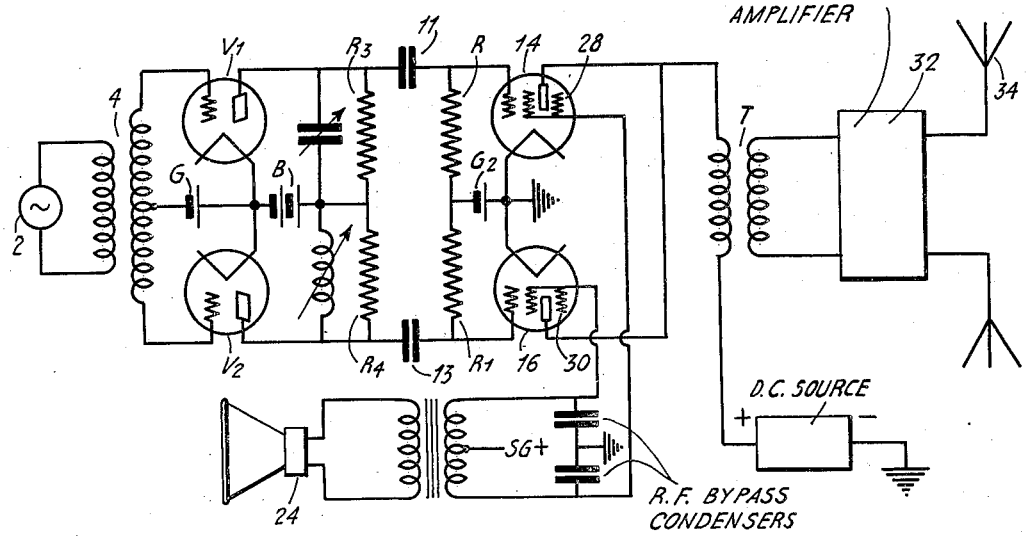

The arrangement of Figure 5 resembles the arrangement of Figure 1 in some respects. In Figure 5, as in Figure 1, the carrier frequency oscillations are fed by way of transformer 4 in phase opposition to the control grids of tubes $V_1$ and $V_2$. In Figure 5, however, the phase shift is obtained by means of the resistance capacity combination in the anode circuit of $V_1$ and the inductance resistance combination in the anode circuit of coupling tube $V_2$. A 45° phase lead is obtained by means of the resistance capacity circuit in the anode of $V_1$, and a 45° phase lag is obtained by means of the resistance inductance combination in the anode lead of $V_2$. This will be clear when it is remembered that if equal capacity and inductance were present in these circuits, the capacity reactance drop would lead 90° and the inductive reactance drop would lag 90°. Hence, by adding parallel resistance to the capacity and inductance, as shown, the drop is made partially resistive and partially reactive. By making the resistive and reactive components equal, the phase lead or lag is 45°. Thus, the voltages of the two anode circuits are 90° plus 180°, due to the push-pull carrier input transformer, or a total of 270° out of phase, which is an optimum amount. Of course the same results would be obtained if the carrier frequency oscillations were fed in phase to the grids of tubes $V_1$ and $V_2$ in a manner similar to that in which they are fed to the grids of the tubes in the arrangement of Figure 4.

Figure 6:
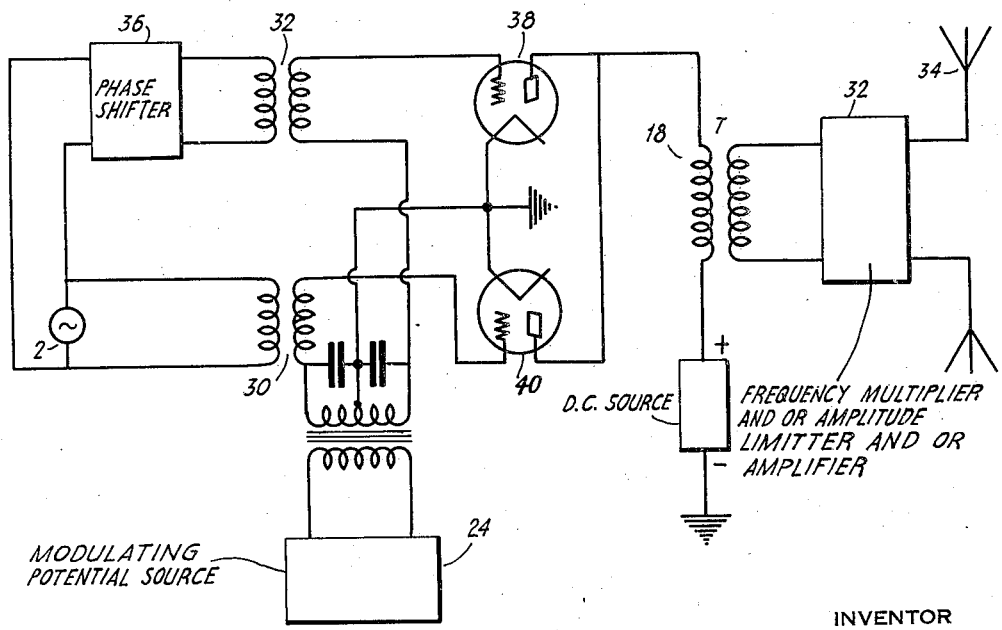

Other arrangements may be used for obtaining the phase shift and for differentially applying the modulating potentials. For example, an arrangement as shown in Figure 6 may be used. In this arrangement carrier frequency oscillations from the source 2 are applied directly by way of transformer 30 to the control grid of a thermionic tube 40 and by way of a phase shifter 36 and transformer 32 to the control grid of a thermionic tube 38. This phase shifter may impart to the carrier frequency oscillations applied to the grids of tubes 38 and 40 the desired relative phase shift, which may be 90°, or any desired amount less than 180°. The phase shifted oscillations appear in the inductance 18, connected, as shown, with the anode circuits of both tubes, and may be applied from said inductance to a utilization circuit 34 by way of a device 32 described hereinbefore.

In the arrangement of Figure 6 the modulating potentials are supplied from the source 24 by way of a modulating transformer, in phase opposition to the control grids of tubes 38 and 40. The modulating potential transformer has its secondary winding connected in series with the radio frequency input circuits of the tubes 38 and 40, as shown. The modulating potentials are applied differentially in series with the carrier voltages on the grids of tubes 38 and 40. The impedances between the anodes and cathodes of the tubes 38 and 40 are non-linear and are obtained by operating the tubes on the square low part of their characteristics.

The modulating potentials applied differentially to the control grids of tubes 38 and 40 determine which of the two tubes supplies the most energy to the inductance 18, and therefore determine which tube controls to the largest extent the output energy, and thereby the phase of the energy, applied to the load.

Where plate modulation is preferable, an arrangement as shown in Figure 7 may be utilized. This arrangement is substantially the same as the arrangement of Figure 6, described hereinbefore. In the arrangement of Figure 6, however, each anode circuit includes an output inductance and a portion of the secondary winding of the modulation transformer, as shown. The direct current supply source is connected between the electrical center of the secondary winding of the modulation frequency transformer and the cathodes of the tubes 38 and 40, as shown. The phase shifted waves are differentially modulated in the tubes 38 and 40, and in particular in the anode circuits thereof, and are impressed therefrom on to the secondary winding of the transformer T2. The coupling between the primary winding of T2 and the secondary winding is preferably variable in order to insure that each tube in turn supplies like amounts of energy to the secondary winding and from said winding to the utilization circuit 34 by way of the devices in 32.

In the arrangement of Figure 8, a combination of screen grid and anode modulation is used. In this arrangement the phase shifted oscillations are supplied to the control grids of the tubes 50 and 52, the input electrodes of which are connected in phase opposition to the secondary winding of a transformer having two primary windings 51 and 53, connected, as shown, to the carrier frequency source. In this arrangement the screen grid electrodes of tubes 50 and 52 are connected, as shown, by way of resistances R4 and R5 to the terminals of the anode windings of transformer T2, as shown, and to the terminals of the secondary winding of the modulation frequency transformer. In other words, the resistances R4 and R5 are connected in series with the two halves of the secondary winding of the modulation frequency transformer between the screen grids and cathodes of the tubes 50 and 52. The inductances which form the primary windings of the transformer T2 are connected in a similar manner between the anodes and cathodes by way of the two portions of the secondary winding in the modulation frequency transformer.

The manner in which differential modulation is accomplished here by both the screen grids and the anodes will be better understood when it is realized that the anode to cathode impedance of each tube is, in a sense, in parallel branches of a circuit, a common portion of which includes a portion of the secondary winding of the modulation frequency transformer. By combining the two types of modulation in this manner a more linear modulation characteristic is obtainable, especially when screen grid tubes are used.

Having thus described my invention and the operation thereof, what I claim is:

1. In a signalling system a source of carrier waves, a source of modulating potentials and a phase modulator comprising a pair of thermionic tubes, each having an anode, a cathode, a control grid and an auxiliary grid-like electrode, a circuit connected between the control grid and cathode of each of said tubes, said circuit being coupled to said source of carrier wave oscillations to apply oscillations of like phase to the control grids of said tubes, reactances tuned to different frequencies connected between the anode and cathode of each of said tubes, an output circuit coupled to the anodes of said tubes, and circuits connecting the auxiliary grid-like electrodes of said tubes in phase opposition to said modulating potential source.

2. In a phase modulator, a source of carrier wave oscillations, a source of signal potentials, a pair of thermionic tubes each having a control grid, a cathode and an anode, an input circuit connected in parallel between the control grid and cathode of said tubes, said input circuit being coupled to said source of carrier wave oscillations, a separate output circuit connected between the anode and cathode of each tube, means for tuning one of said output circuits to a frequency at which it is inductive as to the frequency of the oscillations from said carrier wave source, means for tuning the other of said output circuits to a frequency at which it is capacitive as to the frequency of the oscillations from said carrier wave source, whereby a relative phase shift is produced in the oscillations in said output circuits, and a circuit coupling like electrodes of said tubes in phase opposition to said source of signal potentials to vary the impedances of said tubes in opposite sense at signal potential frequency.

3. A phase modulator as recited in claim 2 wherein a frequency multiplier is coupled to both of said output circuits.

MURRAY G. CROSBY.